United States Patent
Ganesan et al.

(10) Patent No.: US 10,419,996 B2
(45) Date of Patent: Sep. 17, 2019

(54) MOBILE DEVICE WITH AUTOMATIC SWITCHING BETWEEN CELLULAR AND WIFI NETWORKS

(71) Applicant: Vasu Networks Corporation, San Jose, CA (US)

(72) Inventors: Vasudevan Ganesan, San Jose, CA (US); Stephane H. Maes, Fremont, CA (US)

(73) Assignee: Vasu Networks Corporation, San Jose, CA (US)

( * ) Notice: Subject to any disclaimer, the term of this patent is extended or adjusted under 35 U.S.C. 154(b) by 0 days.

(21) Appl. No.: 15/921,275

(22) Filed: Mar. 14, 2018

(65) Prior Publication Data

US 2018/0206164 A1 Jul. 19, 2018

Related U.S. Application Data

(63) Continuation-in-part of application No. 15/480,293, filed on Apr. 5, 2017, which is a continuation of
(Continued)

(51) Int. Cl.
*H04W 36/00* (2009.01)
*H04W 36/14* (2009.01)
(Continued)

(52) U.S. Cl.
CPC .......... *H04W 36/14* (2013.01); *H04M 1/725* (2013.01); *H04M 1/72522* (2013.01);
(Continued)

(58) Field of Classification Search
CPC ................................. H04W 36/0016
(Continued)

(56) References Cited

U.S. PATENT DOCUMENTS 6,009,328 A 12/1999 Muszynski
6,175,737 B1 1/2001 Kao
(Continued)

FOREIGN PATENT DOCUMENTS

CN 1723719 A 1/2006
DE 200310113 U1 1/2004
(Continued)

OTHER PUBLICATIONS

Office Action from Chinese Patent Application No. 201510039302.4, dated Feb. 8, 2018.
(Continued)

*Primary Examiner* — Tu X Nguyen
(74) *Attorney, Agent, or Firm* — Haverstock & Owens LLP

(57) ABSTRACT

A mobile communication device includes, in part, a cellular communication module, a first antenna adapted to receive and transmit data between the mobile communication module and a cellular network, a Wireless Fidelity (Wi-Fi) communication module, a second antenna adapted to receive and transmit data between the Wi-Fi communication module and a VoIP network, a signal monitoring circuit, and a switching circuit adapted to switch an existing communication from the cellular communication module to the Wi-Fi communication module or vice versa.

45 Claims, 2 Drawing Sheets

Related U.S. Application Data application No. 14/806,482, filed on Jul. 22, 2015, now Pat. No. 9,648,538, which is a continuation of application No. 13/899,303, filed on May 21, 2013, now Pat. No. 9,125,128, which is a continuation of application No. 13/168,585, filed on Jun. 24, 2011, now Pat. No. 8,467,789, which is a continuation of application No. 11/031,498, filed on Jan. 6, 2005, now Pat. No. 7,991,399.

(60) Provisional application No. 60/534,466, filed on Jan. 6, 2004.

(51) Int. Cl.
| | | |
|---|---|---|
| *H04W 48/18* | (2009.01) | |
| *H04M 1/725* | (2006.01) | |
| *H04W 52/02* | (2009.01) | |
| *H04W 48/16* | (2009.01) | |
| *H04W 88/06* | (2009.01) | |
| *H04W 84/04* | (2009.01) | |
| *H04W 24/00* | (2009.01) | |
| *H04M 1/253* | (2006.01) | |
| *H04W 84/12* | (2009.01) | |
| *H04W 36/30* | (2009.01) | |

(52) U.S. Cl.
CPC ..... *H04W 36/00837* (2018.08); *H04W 48/16* (2013.01); *H04W 48/18* (2013.01); *H04W 52/0235* (2013.01); *H04M 1/2535* (2013.01); *H04M 2250/06* (2013.01); *H04W 24/00* (2013.01); *H04W 36/30* (2013.01); *H04W 84/042* (2013.01); *H04W 84/12* (2013.01); *H04W 88/06* (2013.01); *Y02D 70/00* (2018.01); *Y02D 70/10* (2018.01); *Y02D 70/12* (2018.01); *Y02D 70/122* (2018.01); *Y02D 70/124* (2018.01); *Y02D 70/126* (2018.01); *Y02D 70/1262* (2018.01); *Y02D 70/14* (2018.01); *Y02D 70/142* (2018.01); *Y02D 70/144* (2018.01); *Y02D 70/146* (2018.01); *Y02D 70/20* (2018.01); *Y02D 70/23* (2018.01)

(58) Field of Classification Search
USPC ............... 455/436, 437, 438, 439, 442, 444
See application file for complete search history.

(56) References Cited

U.S. PATENT DOCUMENTS

| | | |
|---|---|---|
| 6,195,543 B1 | 2/2001 | Granberg |
| 6,473,413 B1 | 10/2002 | Chiou et al. |
| 6,515,983 B1 | 2/2003 | Utas |
| 6,553,022 B2 | 4/2003 | Hartmaier |
| 6,584,087 B1 | 6/2003 | Czaja et al. |
| 6,754,833 B1 | 6/2004 | Black et al. |
| 6,795,700 B2 | 9/2004 | Karaoguz et al. |
| 6,862,444 B2 | 3/2005 | Karaoguz et al. |
| 6,996,107 B2 | 2/2006 | Janoska |
| 7,127,232 B2 | 10/2006 | O'Neil et al. |
| 7,142,847 B2 | 11/2006 | Umeda et al. |
| 7,254,119 B2 | 8/2007 | Jiang et al. |
| 7,382,763 B2 | 6/2008 | Ludwig et al. |
| 7,398,088 B2 | 7/2008 | Belkin et al. |
| 7,483,984 B1 | 1/2009 | Jonker et al. |
| 7,512,796 B2 | 3/2009 | Haverinen et al. |
| 8,041,360 B2 | 10/2011 | Ibe et al. |
| 8,514,867 B2 | 8/2013 | Ganesan |
| 8,520,605 B2 | 8/2013 | Ganesan |
| 8,958,434 B2 | 2/2015 | Ganesan |
| 2001/0049790 A1 | 12/2001 | Faccin et al. |
| 2002/0073226 A1 | 6/2002 | Sridhar |
| 2002/0078174 A1 | 6/2002 | Sim et al. |
| 2002/0085516 A1 | 7/2002 | Bridgelall |
| 2002/0114305 A1 | 8/2002 | Oyama et al. |
| 2002/0147008 A1 | 10/2002 | Kallio |
| 2002/0150228 A1 | 10/2002 | Umeda et al. |
| 2002/0152305 A1 | 10/2002 | Jackson et al. |
| 2002/0183038 A1 | 12/2002 | Comstock et al. |
| 2003/0009580 A1 | 1/2003 | Chen |
| 2003/0012350 A1 | 1/2003 | Wong et al. |
| 2003/0053632 A1 | 3/2003 | Bousis |
| 2003/0058876 A1 | 3/2003 | Connor |
| 2003/0061206 A1 | 3/2003 | Qian |
| 2003/0083079 A1 | 5/2003 | Clark et al. |
| 2003/0086366 A1 | 5/2003 | Branlund et al. |
| 2003/0087629 A1 | 5/2003 | Juitt et al. |
| 2003/0112766 A1 | 6/2003 | Riedel et al. |
| 2003/0133421 A1 | 7/2003 | Sundar |
| 2003/0157899 A1 | 8/2003 | Trossen et al. |
| 2003/0163697 A1 | 8/2003 | Pabla |
| 2003/0177196 A1 | 9/2003 | Bhasin et al. |
| 2003/0185172 A1 | 10/2003 | Rue |
| 2003/0217007 A1 | 11/2003 | Fukushima et al. |
| 2003/0217091 A1 | 11/2003 | Echigo et al. |
| 2003/0224792 A1 | 12/2003 | Verma et al. |
| 2003/0232615 A1 | 12/2003 | Kim et al. |
| 2004/0005878 A1 | 1/2004 | Olin et al. |
| 2004/0030791 A1 | 2/2004 | Dorenbosch et al. |
| 2004/0052223 A1 | 3/2004 | Karaoguz |
| 2004/0053599 A1 | 3/2004 | Karaoguz |
| 2004/0076144 A1 | 4/2004 | Ishidoshiro |
| 2004/0083360 A1 | 4/2004 | Walsh |
| 2004/0085959 A1 | 5/2004 | Ohkawa |
| 2004/0087307 A1 | 5/2004 | Ibe et al. |
| 2004/0095916 A1 | 5/2004 | Maki |
| 2004/0105424 A1 | 6/2004 | Skoczowski et al. |
| 2004/0114559 A1 | 6/2004 | Wang |
| 2004/0127208 A1 | 7/2004 | Nair et al. |
| 2004/0132427 A1 | 7/2004 | Lee et al. |
| 2004/0137902 A1 | 7/2004 | Chaskar et al. |
| 2004/0141484 A1 | 7/2004 | Rogalski et al. |
| 2004/0153676 A1* | 8/2004 | Krantz .................. G06F 1/3203 713/300 |
| 2004/0170173 A1 | 9/2004 | Pan |
| 2004/0174880 A1 | 9/2004 | White et al. |
| 2004/0176128 A1 | 9/2004 | Grabelsky et al. |
| 2004/0181811 A1 | 9/2004 | Rakib |
| 2004/0192294 A1 | 9/2004 | Pan et al. |
| 2004/0203666 A1 | 10/2004 | Foster et al. |
| 2004/0203788 A1* | 10/2004 | Fors .................. H04W 36/0066 455/439 |
| 2004/0203802 A1 | 10/2004 | McCormick et al. |
| 2004/0204097 A1 | 10/2004 | Scheinert et al. |
| 2004/0205158 A1 | 10/2004 | Hsu |
| 2004/0218575 A1 | 11/2004 | Ibe et al. |
| 2004/0229618 A1 | 11/2004 | Adatrao et al. |
| 2004/0246990 A1 | 12/2004 | Krishnamurthi et al. |
| 2004/0267880 A1 | 12/2004 | Patiejunas |
| 2005/0025164 A1* | 2/2005 | Kavanagh ......... H04W 36/0033 370/401 |
| 2005/0044138 A1 | 2/2005 | Albert et al. |
| 2005/0059400 A1 | 3/2005 | Jagadeesan et al. |
| 2005/0090259 A1 | 4/2005 | Jain et al. |
| 2005/0135286 A1 | 6/2005 | Nurminen |
| 2005/0147049 A1 | 7/2005 | Ganesan |
| 2005/0149740 A1 | 7/2005 | Kotzin et al. |
| 2005/0239498 A1 | 10/2005 | Dorenbosch |
| 2005/0259958 A1 | 11/2005 | Johansson |
| 2006/0003796 A1 | 1/2006 | Vireday |
| 2006/0009219 A1* | 1/2006 | Jaakkola ................ H04B 1/406 455/435.2 |
| 2006/0010272 A1* | 1/2006 | Solomon ............ G06F 15/7867 710/105 |
| 2006/0040711 A1 | 2/2006 | Whistler |
| 2006/0050663 A1 | 3/2006 | Ganesan |
| 2006/0050687 A1 | 3/2006 | Ganesan |
| 2006/0050721 A1 | 3/2006 | Ganesan |
| 2006/0080423 A1 | 4/2006 | Brewer et al. |
| 2006/0092901 A1 | 5/2006 | Parantainen |
| 2006/0098643 A1 | 5/2006 | Pfeffer |

(56) References Cited

U.S. PATENT DOCUMENTS

| | | | |
|---|---|---|---|
| 2006/0105766 A1* | 5/2006 | Azada | H04W 48/18 455/432.1 |
| 2006/0141984 A1 | 6/2006 | Taglienti | |
| 2006/0146767 A1 | 7/2006 | Moganti | |
| 2006/0234678 A1 | 10/2006 | Juitt et al. | |
| 2006/0291455 A1 | 12/2006 | Katz et al. | |
| 2007/0026862 A1 | 2/2007 | Hicks, III | |
| 2007/0076665 A1 | 4/2007 | Nair et al. | |
| 2007/0112948 A1 | 4/2007 | Uhlik | |
| 2007/0124490 A1 | 5/2007 | Kalavade et al. | |
| 2007/0249390 A1 | 10/2007 | Purkayastha et al. | |
| 2009/0070489 A1 | 3/2009 | Lu et al. | |
| 2009/0191864 A1 | 7/2009 | Mousseau | |
| 2010/0074228 A1 | 3/2010 | Hicks et al. | |
| 2011/0010282 A1 | 1/2011 | Olin et al. | |
| 2011/0044310 A1 | 2/2011 | Uhlik | |
| 2014/0204902 A1* | 7/2014 | Maltsev | H04W 36/0083 370/331 |

FOREIGN PATENT DOCUMENTS

| | | | |
|---|---|---|---|
| EP | 0936777 | A1 | 8/1999 |
| EP | 1471665 | A1 | 10/2004 |
| GB | 2287858 | A | 9/1995 |
| JP | 200226994 | A | 1/2002 |
| JP | 2004320473 | A | 11/2004 |
| WO | 03056719 | A1 | 7/2003 |
| WO | 2003061177 | A2 | 7/2003 |
| WO | 2003061177 | A3 | 7/2003 |
| WO | 2004013998 | A2 | 2/2004 |
| WO | 2004057903 | A1 | 7/2004 |

OTHER PUBLICATIONS

3GPP Organization Project,"3rd Generation Partnership Project; Technical Specification Group Services and System Aspects Service Aspects; Handover requirements between UTRAN and GERAN or other radio systems (Release 8)",Mar. 2006, pp. 1-20.

3GPP Organization Project,"3rd Generation Partnership Project; Technical Specification Group Services and System Aspects Service Aspects;Service Principles (Release 8)",Mar. 2006, pp. 1-45.

3GPP Organization Project, 3rd Generation Partnership Project; Technical Specification Group Services and System Aspects Service Aspects; Service Requirements for the All-IP Network(AIPN);V8.0.0, Stage 1, (Release 8),p. 1-24.

Unlicensed Mobile Access (UMA); Protocols (Stage 3), R1.0.4, May 2, 2005, pp. 1-162.

* cited by examiner

MOBILE DEVICE WITH AUTOMATIC SWITCHING BETWEEN CELLULAR AND WIFI NETWORKS

CROSS-REFERENCES TO RELATED APPLICATIONS

This patent application is a continuation-in-part application of co-pending U.S. patent application Ser. No. 15/480,293, filed on Apr. 5, 2017, and entitled "TELEPHONE WITH AUTOMATIC SWITCHING BETWEEN CELLULAR AND VOIP NETWORKS," which is a continuation application of co-pending U.S. patent application Ser. No. 14/806,482, filed on Jul. 22, 2015, and entitled "TELEPHONE WITH AUTOMATIC SWITCHING BETWEEN CELLULAR AND VOIP NETWORKS," which is a continuation application of U.S. patent application Ser. No. 13/899,303, filed on May 21, 2013, and entitled "TELEPHONE WITH AUTOMATIC SWITCHING BETWEEN CELLULAR AND VOIP NETWORKS," which is a continuation application of U.S. patent application Ser. No. 13/168,585, filed on Jun. 24, 2011, and entitled "TELEPHONE WITH AUTOMATIC SWITCHING BETWEEN CELLULAR AND VOIP NETWORKS," which is a continuation application of U.S. Pat. No. 7,991,399, filed on Jan. 6, 2005, and entitled "TELEPHONE WITH AUTOMATIC SWITCHING BETWEEN CELLULAR AND VOIP NETWORKS," which claims benefit under 35 USC 119(e) of the filing date of U.S. provisional application No. 60/534,466, filed on Jan. 6, 2004, entitled "Radiotelephone With Automatic Switching Between Cellular And Wi Fi Networks Using Wi-Fi Signal Strength Values." The content of all of the above is incorporated herein by reference in its entirety.

BACKGROUND OF THE INVENTION

A small portion of the radio frequency (RF) spectrum is assigned to each communications carrier. The assigned spectrum, therefore, must be used efficiently in order to allow the maximum number of frequency users to have access to this spectrum. Multiple access modulation techniques have been developed to provide optimum utilizing of the RF spectrum. Examples of such modulation techniques include time division multiple access (TDMA), frequency division multiple access (FDMA), and code division multiple access (CDMA).

There is a wide variance in the performance of wireless networks. A conventional wireless cellular network, covers a relatively large geographical area but provides a relatively low bandwidth. Such wireless networks use regulated portions of the radio spectrum and are shared by many users. The infrastructure costs of wireless networks are relatively high due to the size and complexity of the cellular network equipment.

Other wireless networks, such as CDMA2000-EV-DO/DV networks, offer higher bandwidth and enhanced data services, such as web browsing. However, these networks also pack many users into a relatively small portion of the regulated spectrum. Other types of radio networks are adapted to improve spectral efficiency with increased and smaller coverage areas. For example, an IEEE 802.11x (or Wi-Fi) network may transmit at speeds up to 11 Mbps using a Direct Sequence Spread Spectrum (DSSS) mode or at speeds up to 54 Mbps using an Orthogonal Frequency Division Multiplexing (OFDM) mode.

An access point conforming to an IEEE 802.11x (e.g., IEEE 802.11b) network may cover an area of a few hundred feet in diameter. Each such access point is connected to a larger network (e.g., Internet). In order to cover larger geographical areas, a relatively large number of IEEE 802.11x network access points and a relatively large wireline back haul networks are required. In part, due to the back haul costs, the resulting IEEE 802.11x based network may thus be more expensive to set up and operate than a similarly based wireless network. In other words, many tradeoffs often exist between and among the coverage areas, the maximum bit-rates, and the costs associated with different types of wireless networks.

Demand for high bandwidth and quality of service (QoS) associated with mobile communication devices with full roaming capability is on the rise. One known communication device includes a cellular communication module adapted to enable communication using wireless cellular networks as well as a Wi-Fi communication module adapted to enable communication using a Voice over IP (VoIP) protocol. In such devices, to change the communication mode from cellular to VoIP or vice versa, the user has to manually change the device's setting by, e.g., pressing one ore more keys.

In yet other communication devices known to be under development, to switch the communication mode from, for example, cellular to VoIP, the cellular network first detects the position of the mobile communication device to determine whether the mobile communication device is in a Wi-Fi area. If it so detects, the cellular network sends a switching signal to the mobile communication device to enable the communication to continue the communication using the VoIP protocol. However, obtaining and maintaining accurate position of many mobile communication devices concurrently poses a challenging task. Consequently, in such systems, the switching of the call from cellular to VoIP or vice versa may result in the loss of the call.

BRIEF SUMMARY OF THE INVENTION

In accordance with the present invention, a mobile communication device is configured so as to automatically switch a communication that is already in progress using a wireless cellular network (hereinafter alternatively referred to as cellular network) to a wireless Voice over IP (VoIP) network or vice versa. The mobile communication devices is adapted to include, in part, a cellular communication module, a first antenna adapted to receive and transmit data between the mobile communication module and a cellular network, a Wireless Fidelity (Wi-Fi) communication module, a second antenna adapted to receive and transmit data between the Wi-Fi communication module and a VoIP network, a signal monitoring circuit, and a switching circuit adapted to switch an existing in-progress communication between the cellular communication module and the Wi-Fi communication module. The second antenna and associated circuitry are maintained in on-states continuously to monitor and detect Wi-Fi signals.

If the mobile communication device is in an in-progress (i.e., pre-established) communication via its cellular communication module and through a cellular network, and the Wi-Fi antenna system detects a Wi-Fi signal having a first predefined level (strength), a timer disposed in the mobile communication device is activated to establish a first time window of a first predefined size. If the Wi-Fi signal level detected during the first time window remains equal to or greater than the first predefined level, at the expiration of the first time window, the switching circuit causes the in-progress communication to be switched from its cellular communication module to its Wi-Fi communication module and through a VoIP network without losing the in-progress communication.

In some embodiments, upon activating the timer, the Wi-Fi communication module is caused to change state from a sleep mode, during which the Wi-Fi communication module consumes relatively small amount of power, to a stand-by mode during which the Wi-Fi communication module consumes an intermediate amount of power. Subsequently, before the communication is switched to the Wi-Fi communication module, the Wi-Fi communication module is caused to be placed in a full active mode, during which the Wi-Fi communication module consumes an amount of power larger than the intermediate amount of power.

If the mobile communication device is in a pre-established communication via its Wi-Fi communication module and through a VoIP network, and the Wi-Fi antenna system detects that the level of the received Wi-Fi signal is below a second predefined value, the timer is activated to establish a second time window of a second predefine size. If the Wi-Fi signal level detected during the second time window is equal to or greater than a third predefined value, the pre-established communication via the Wi-Fi communication module is maintained without any change. If the Wi-Fi signal level detected during the second time window is less than the third predefined value, the timer is reset and reactivated to establish a third time window of a third size. If the Wi-Fi signal level detected during the third time window is less than the third predefined value, at the expiration of the third time window, the switching circuit causes the in-progress communication to be switched from its Wi-Fi communication module to its cellular communication module and through a cellular network without losing the in-progress communication.

In some embodiments, upon activating the timer to establish the second time window, the cellular communication module is caused to change state from a sleep mode, during which the cellular communication module consumes relatively small amount of power, to a stand-by mode during which the cellular communication module consumes an intermediate amount of power. Subsequently, before the communication is switched to the Wi-Fi communication module, the cellular communication module is caused to be placed in a full active mode, during which the cellular communication module consumes an amount of power larger than the intermediate amount of power.

In some embodiments, the Wi-Fi communication module is adapted to communicate with an access point of a Wi-Fi local are network using an 802.11x wireless protocol, and the cellular communication module is adapted to communicate with a base station of a wireless cellular network using any one of GSM, CDMA, or CDMA2000 protocols.

DETAILED DESCRIPTION OF THE INVENTION

Figure 1:
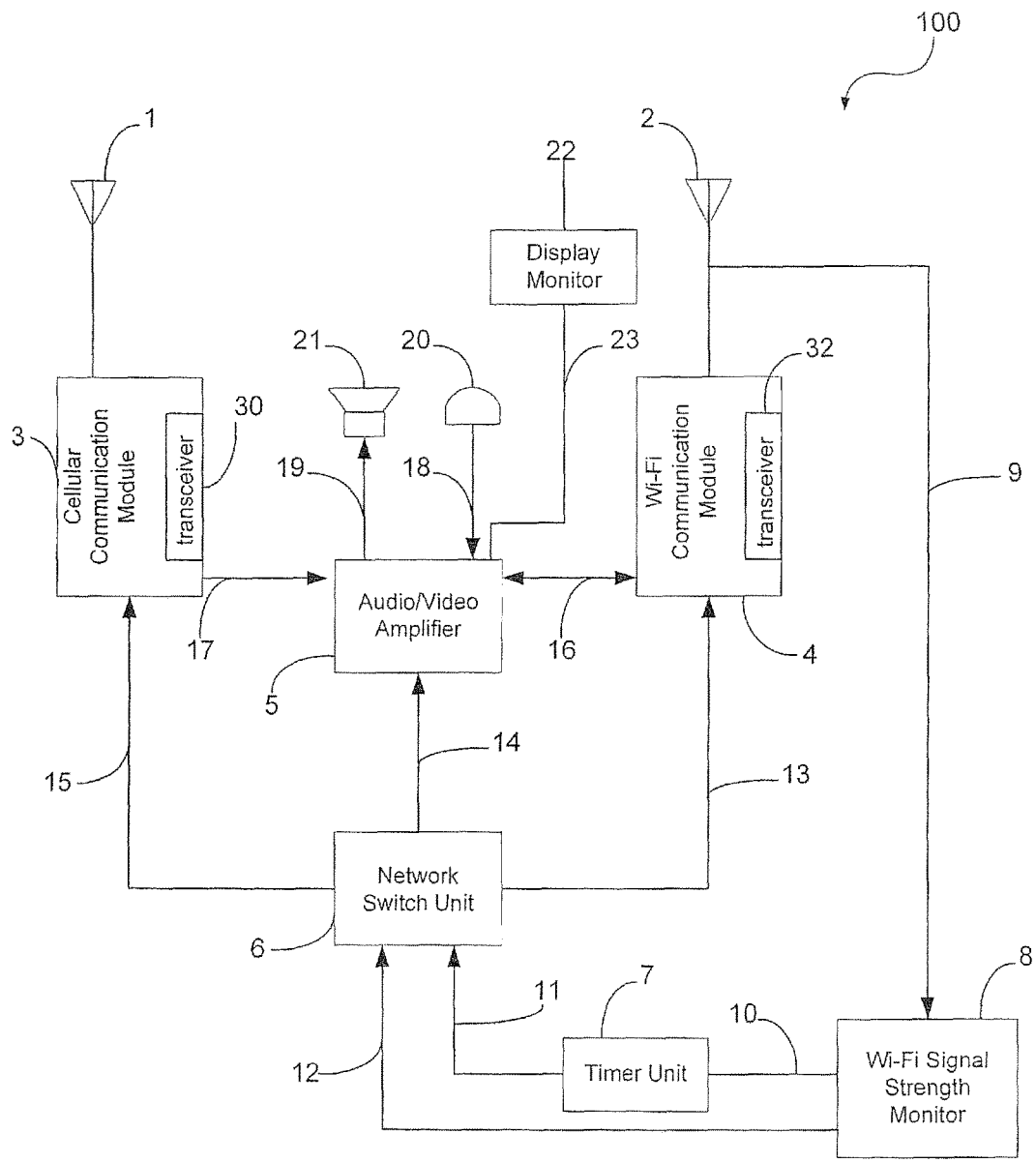
FIG. 1 is a simplified high-level block diagram of a mobile communication device, in accordance with one embodiment of the present invention.

In accordance with the present invention, a mobile communication device is configured so as to automatically switch an existing communication from a wireless cellular network (hereinafter alternatively referred to as cellular network) to a wireless Voice over IP (VoIP) network, or to switch an existing communication from a VoIP network to a cellular network. It is understood that the Wireless Fidelity (Wi-Fi) signals, as defined, for example, in IEEE 802.11x standards or other equivalent standards may be used to communicate with a Voice over IP (VoIP) network. The mobile communication device is adapted to include, in part, a cellular communication module, a first antenna adapted to receive and transmit data between the mobile communication module and a cellular network, a Wi-Fi communication module, a second antenna adapted to receive and transmit data between the Wi-Fi communication module and a VoIP network, a signal monitoring circuit, and a switching circuit adapted to switch an existing in-progress communication between the cellular communication module and the Wi-Fi communication module. The second antenna and associated circuitry are maintained in on-states continuously to monitor and detect Wi-Fi signals.

It is understood the wireless cellular network includes, in part, a multitude of base stations. Each such base station is adapted to communicate with the mobile communication device when the mobile communication device is located within the coverage area of the base station via RF signals carried over cellular network. It is also understood that each such coverage area is defined by an area centered at the base station and having a radius of, e.g., several miles. It is further understood that a Wi-Fi network may include, in part, a multitude of access points. Each such access point is adapted to communicate with the mobile communication device, when the mobile communication device is located within the coverage area of the access point, via VoIP packets. It is also understood that the mobile communication device may also include blocks adapted for computation and thus be a communication/computation device.

If the mobile communication device is in an in-progress (i.e., pre-established) communication via its cellular communication module and through a cellular network, and the Wi-Fi antenna system detects a Wi-Fi signal having a first predefined level (strength), a timer disposed in the mobile communication device is activated to establish a first time window of a first predefined size. If the Wi-Fi signal level detected during the first time window remains equal to or greater than the first predefined level, at the expiration of the first time window, the switching circuit causes the in-progress communication to be switched from its cellular communication module to its Wi-Fi communication module and through a VoIP network without losing the in-progress communication.

in some embodiments, upon activating the timer, the Wi-Fi communication module is caused to change state from a sleep mode, during which the Wi-Fi communication module consumes relatively small amount of power, to a stand-by mode during which the Wi-Fi communication module consumes an intermediate amount of power. Subsequently, before the communication is switched to the Wi-Fi communication module, the Wi-Fi communication module is caused to be placed in a full active mode, during which the Wi-Fi communication module consumes an amount of power larger than the intermediate amount of power.

If the mobile communication device is in a pre-established communication via its Wi-Fi communication module and through a VoIP network, and the Wi-Fi antenna system detects that the level of the received Wi-Fi signal is below a second predefined value, the timer is activated to establish a second time window of a second predefine size. If the Wi-Fi signal level detected during the second time window is equal to or greater than a third predefined value, the pre-established communication via the Wi-Fi communication module is maintained without any change. If the Wi-Fi signal level detected during the second time window is less than the third predefined value, the timer is reset and reactivated to establish a third time window of a third size. If the Wi-Fi signal level detected during the third time window is less than the third predefined value, at the expiration of the third time window, the switching circuit causes the in-progress communication to be switched from its Wi-Fi communication module to its cellular communication module and through a cellular network without losing the in-progress communication.

In some embodiments, upon activating the timer to establish the second time window, the cellular communication module is caused to change state from a sleep mode, during which the cellular communication module consumes relatively small amount of power, to a stand-by mode during which the cellular communication module consumes an intermediate amount of power. Subsequently, before the communication is switched to the Wi-Fi communication module, the cellular communication module is caused to be placed in a full active mode, during which the cellular communication module consumes an amount of power larger than the intermediate amount of power.

FIG. 1 is a simplified high-level block diagram of a mobile communication device 100, in accordance with one embodiment of the present invention. Mobile communication device 100, which is adapted to automatically switch communication between cellular and VoIP networks, is shown as including, in part, a cellular communication module (hereinafter alternatively referred to as cellular module) 3 coupled to a cellular antenna 1, a Wi-Fi communication module (hereinafter alternatively referred to as Wi-Fi module) 4 coupled to a Wi-Fi antenna 2, an audio/video amplifier 5, a network switch unit 6, a timer unit 7, a Wi-Fi signal level monitor 8, a microphone 20, a speaker 21, and a display monitor 22. Mobile communication device 100 is adapted to establish and maintain communication via either a cellular module 3, through a wireless network (not shown), and/or via Wi-Fi module 4, through a VoIP network (not shown). Cellular module 3 further includes a transceiver 30 adapted to transmit signal to and receive signal from a cellular network. Wi-Fi module 4 further includes a transceiver 32 adapted to transmit signal to and receive signal from a VoIP network. Depending on the level of detected Wi-Fi signal emitted from a Wi-Fi access point, a call initially established via cellular module 3 may be switched to be handle by Wi-Fi module 4, or a call initially established via Wi-Fi module 4 may be switched to be handled by cellular module 3.

Assume that mobile communication device 100 is in communications with a cellular network and is entering the coverage area of a Wi-Fi access point adapted to transmit and receive Wi-Fi signals. As is known, a Wi-Fi access point may be used to gain access to a VoIP network. Wi-Fi antenna 2 together with Wi-Fi module 4 and Wi-Fi signal monitor 8 continuously monitor for to detect Wi-Fi signals. If a detected Wi-Fi signal level is greater than a predefined threshold value $V_{th1}$, Wi-Fi signal level monitor 8 activates timer 7 via signal line 10 and sends a wake-up signal to network switch unit 6 via signal line 12, thereby to change the state of network switch unit 6 from a sleep mode, during which network switch unit consumes relatively small power, to a stand-by mode, during which network switch unit consumes an intermediate amount of power. Network switch unit 6, in turn, supplies wake-up switching signals to cellular module 3 via signal line 15 and to Wi-Fi module 4 via signal line 13. This causes phone cellular module 3 and Wi-Fi module 4 to activate their respective switching modules. The detected Wi-Fi signal level may be determined, for example, by taking multiple samples of the incoming Wi-Fi signal(s) and computing a signal level from these samples. In one embodiment, an average of the amplitudes/phases of the sampled signals may be used to detect the Wi-Fi signal level.

Figure 2:
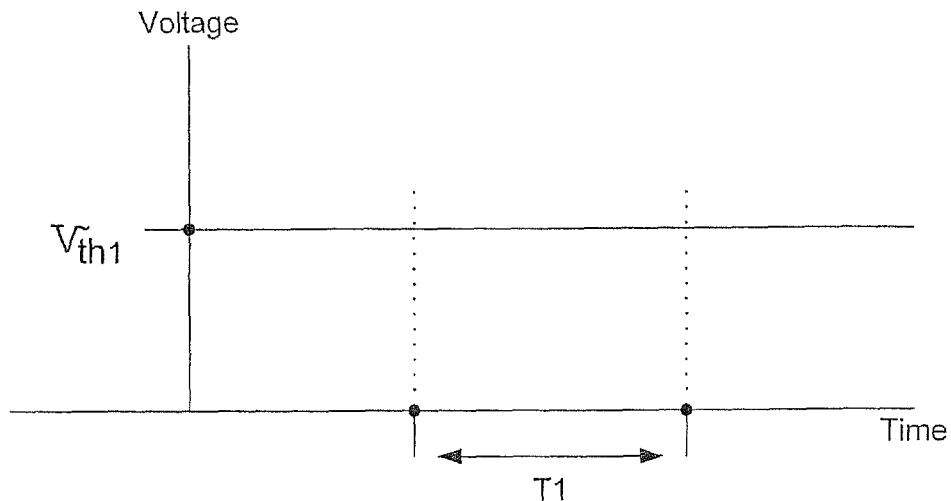
FIG. 2 shows Wi-Fi signal threshold level and timing window used to determine whether to switch a communication from the cellular communication module to the Wi-Fi communication module of the communication device of FIG. 1, in accordance with one embodiment.

If the detected Wi-Fi signal level is greater than $V_{th1}$, timer unit 7 is activated to establish a first time window of a first predefined size $T_1$, as shown in FIG. 2. During time window $T_1$, Wi-Fi antenna 2 together with Wi-Fi module 4 and Wi-Fi signal monitor 8 continue to monitor and detect the level of received Wi-Fi signal. If the Wi-Fi signal level detected during time window $T_1$ remains equal to or greater than $V_{th1}$, at the expiration of time window $T_1$, timer unit 7 sends a cellular tear-down signal and a Wi-Fi link-up signal to the network switch unit 6 via signal line 11. In response, network switch unit 6 sends the tear-down signal to cellular module 3 via signal line 15, and sends the link-up signal to Wi-Fi module 4 via signal line 13. Network switch unit 6 also instructs audio/video amplifier 5, via signal line 14, to generate an audio/video alert signal. The generated audio alter signal is subsequently reproduced by speaker 21 via signal line 18, and the generated video alert signal is subsequently reproduced by display monitor 22 via signal line 23. The audio/video alert tones are adapted to notify the mobile communication device user of a network switch from cellular to Wi-Fi.

Cellular module 3 is adapted to terminate connection to the cellular network and to switch off connection to audio/video amplifier 5 after receiving the tear-down signal. Wi-Fi module 4 is adapted to activate connection to VoIP network and to switch on connection to audio/video amplifier 5—for passing voice signal to audio amplifier 5 and video signal to display monitor 22—after receiving a Wi-Fi link-up signal. The previously established communication link is thus continued uninterrupted via the VoIP network and through loudspeaker 21, microphone 20 and display monitor 23.

Assume that mobile communication device 100 is in communications with a VoIP network and may be leaving the coverage area of the Wi-Fi access point. Wi-Fi antenna 2 together with Wi-Fi module 4 and Wi-Fi signal monitor 8 continuously monitor for to detect Wi-Fi signals. If the detected Wi-Fi signal level falls below a second predefined threshold value $V_{th2}$, Wi-Fi signal level monitor 8 activates timer 7 and sends a wake-up signal to network switch unit 6 to change the state of network switch unit 6 from the sleep mode to stand-by mode. Network switch unit 6, in turn, supplies wake-up switching signals to cellular module 3 and to Wi-Fi module 4 to enable these modules to activate their respective switching procedures.

Figure 3:
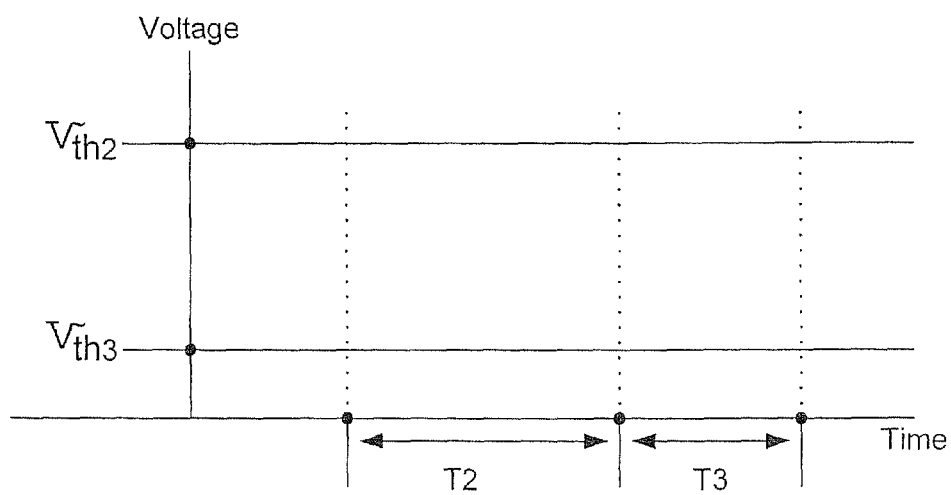
FIG. 3 shows Wi-Fi signal threshold levels and timing windows used to determine whether to switch a communication from the Wi-Fi communication module to the cellular communication module of the communication device of FIG. 1, in accordance with one embodiment.

Once activated, timer unit 7 establishes a second time window of a second predefined size $T_2$, as shown in FIG. 3. During time window $T_2$, Wi-Fi antenna 2 together with Wi-Fi module 4 and Wi-Fi signal monitor 8 continue to monitor and detect the level of received Wi-Fi signal. If the Wi-Fi signal level detected during time window $T_2$ is equal to or greater than a third predefined threshold value $V_{th3}$, where $V_{th3}$ is smaller than $V_{th2}$, the previously established VoIP communication continues without switching.

If the Wi-Fi signal level detected during time window $T_2$ is smaller than $V_{th3}$, at the expiration of time window $T_2$, timer unit 7 is reset and activated to establishes a third time window of a third predefined size $T_3$, where $T_3$ is smaller than $T_2$. If the Wi-Fi signal level detected during time window $T_3$ is equal to or greater than $V_{th3}$, the previously established VoIP communication continues without switching.

If the Wi-Fi signal level detected during time window $T_3$ is less than $V_{th3}$, at the expiration of time window $T_3$, timer unit 7 sends a Wi-Fi tear-down signal and a cellular link-up signal to network switch unit 6. In response, network switch unit 6 sends the tear-down signal to Wi-Fi module 3, and sends the link-up signal to cellular module 4. Network switch unit 6 also instructs audio/video amplifier 5 to generate an audio/video alert signals. The generated audio alter signals is subsequently reproduced by speaker 21, and the generated video alert signal is subsequently reproduced by display monitor 22. The audio/video alert tones are adapted to notify the mobile communication device user of a network switch from Wi-Fi to cellular Wi-Fi module 4 is adapted to terminate connection to the VoIP network and to switch off connection to audio/video amplifier 5 after receiving the tear-down signal. Cellular module 4 is adapted to activate connection to the cellular network and to switch on connection to audio/video amplifier 5 after receiving a Wi-Fi link-up signal. The previously established communication link is thus continued uninterrupted and through loudspeaker 21, microphone 20 and display monitor 23.

In accordance with some embodiments, if the mobile communication device detects both an Wi-Fi signal from an access point and a cellular signal from a mobile cellular base station before establishing a communication link, the mobile communication device first attempts to establish communication with the Wi-Fi access point using Wi-Fi module 4.

As described herein, the method of providing communications for a mobile communication device that roams between multiple wireless networks includes monitoring context of a signal of a wireless communication link. Monitoring context of a signal is able to include monitoring the strength of the (radio) signal and/or characteristics of the network (e.g., available speed/bandwidth, delays, congestion, power requirements, availability/type of encryption, cost, preference, policies, known versus not known, Quality of Service (QoS), Service Level Agreement (SLA), history and/or any other characteristics/context information). Cost of a signal is able to include determining if using a specified network has any fees. For example, a network provides a pricing message upon connection. Networks may have certain policies such as limiting or throttling data which may affect a signal, and the policy information is able to be determined in any manner such as by receiving metadata information from a network or analyzing network information. A user or device may "know" certain networks (e.g., a user has already connected to the network previously or has placed the network in a "known" list), and other networks may not be known (e.g., have not been previously accessed), and known networks may receive priority or preference over unknown networks (e.g., by checking the "known" list and giving priority to networks found on the "known" list). QoS of a network is able to be factored in when selecting a network. For example, data/service logs of networks are able to be analyzed to determine QoS. SLAB are able to be analyzed to determine which network is accessed. History information is able to be used when selecting a network. When a new network is detected as available, and settings indicate a second wireless communication link is preferable based on the context, then the interface server is notified and a second communication link is established between the interface server and the end destination device. For example, if any context values are below a threshold, and a second or additional network is detected with context values above the threshold or above the context values of the current network, then the device switches to the second or additional network. In addition to detecting multiple signal levels and comparing them to multiple thresholds, there are able to be multiple context levels and multiple thresholds compared with the multiple context levels.

In some embodiments, a same network is utilized but with a different data path or other modification based on a context. For example, different bearers for a same radio network for a different type of signal are utilized based on the context. Furthering the example, if a bearer with a better QoS is available, then the better bearer is utilized for the method of providing communications. For example, the QoS of bearers of a network are continuously monitored, and the bearer with the highest QoS is utilized, and if the QoS of an in-use bearer falls below the QoS of another bearer, then the method switches to the bearer with the higher QoS. In some embodiments, the communications are able to be split among different data paths, bearers, networks and/or any other division. For example, some data is sent on a first bearer, and then other data is sent on a second bearer based on the context and/or any other relevant information. Moreover, as described herein, the processes described herein are not limited to wireless implementations, as it is able to be applied to any network such as a wired network.

In some embodiments, instead of the device switching to another network, the network switches to another device. For example, if for some reason, a context of a first device for a network falls below a threshold for the context, then a second device is coupled to the network with a context above the threshold. Similarly, modules within a device are able to be switched based on the context dropping below a threshold. For example, a first application on a device is communicating with a network, but a context (e.g., signal quality) of the first application and the network drops below a threshold, then a second application which uses a different signal or other varying communication implementation communicates with the network.

In some embodiments, the context is able to be detected using a distributed system (e.g., multiple devices collect context information such as using sensors to detect signal strength and provide the collected information to a decision making device). Furthering the example, signal strength is collected and/or analyzed by sensors and/or other devices in a distributed manner. The processing is able to take place anywhere between the collection of the signal and where a decision is made/taken. Following a decision to switch, the instructions to switch are able to be exchanged back with another point where the switch takes place (e.g., from in network sent to an access point/tower or to a device to switch). Information is able to be exchanged with other points to re-route traffic, which allows targeting SDN.

Context detection/determination is able to include monitoring/analyzing contexts of known networks (and any changes in contexts). For example, if the signal strength of a first network falls below the signal strength for a second network, then based on that context change, the communication is switched to the more optimal context. Context detection/determination is also able to include detection/determination of a new network which has a new, more favorable context. For example, if a communication is using Network 1 of five known networks, and then Network 6 is detected which has a higher context (e.g., signal strength) than Network 1, the communication is switched to Network 6.

As described herein, any communication is able to be switched automatically, such as user to user communications via one or more servers in a network (e.g., voice video, conference call, multimedia calls) and peer to peer communications where a first device chats/communicates directly with another device through the network or without a network.

The networks described herein are able to be any networks such as wired, wireless (e.g., 2G, 3G, 4G, 5G, LTE, WiMAX, Bluetooth, infrared, Internet of Things protocols and any other wireless network/protocol) or any combination thereof.

The communications for a mobile communication device include a telephone call, a voice call/communication, and/or duplex streaming/exchange. The communication is able to be transformed from one form to another. For example, a telephone call on one end is transformed to a voice call/communication or duplex streaming/exchange. The communications are able to be a transmission of broadband content. The communications are able to include a secure data transmission or an unsecured data transmission. The communications are able to be pushed or pulled. The communications are able to include streaming, video exchange and/or video calling.

As described herein, the method of providing communications, including switching, for a device that roams between multiple wireless networks is able to be implemented on any device such as a mobile device, a cloud device, a switch and/or a router (on the premises or off the premises such as in the cloud), an enterprise/data-center, a telephone switch (3G, 4G, 5G, xG), a small cell, an edge router, a field router, an access point, a base station, and/or any other device. The method is able to be implemented in software, hardware, firmware or a combination thereof. The device (e.g., server) is able to be included in any system such as a transportation device/system such as automobile, ship/boat, and/or airplane.

The above embodiments of the present invention are illustrative and not limiting. Various alternatives and equivalents are possible. It is understood that the functionality associated with any blocks described above may be centralized or distributed, whether locally or remotely. It is also understood that one or more blocks of each mobile communication device may be performed by hardware, firmware or software, or some combinations thereof. The invention is not limited by the type of cellular network, e.g., CDMA, GSM, otherwise used to carry communication. Nor is the invention limited by the VoIP network. The invention is not limited by the Wi-Fi signals, such as those defined by IEEE 802.11x, where x may be a, b, g, or WiMAX used to carry VoIP communication. The invention is not limited by the type of integrated circuit(s) in which the present invention may be disposed. Nor is the invention limited to any specific type of process technology, e.g., CMOS, Bipolar, or BIC-MOS that may be used to manufacture the present invention. Other additions, subtractions or modifications are obvious in view of the present invention and are intended to fall within the scope of the appended claims.

We claim:

1. A device comprising:
a switching system to switch operation between a first communication module and a second communication module, wherein if a context changes for known networks or a new network is detected with a more favorable context, a previously established communication automatically switches accordingly, wherein upon activation of a timer, the switching system causes the second communication module to change state from a sleep mode to a stand-by mode, and the switching system causes the second communication module to change state from the stand-by mode to an active mode before a communication is switched to the second communication module.

2. The device of claim 1, wherein when the context comprises signal strength characteristics, if a signal monitor detects that a Wi-Fi signal level is equal to or greater than a predefined threshold value, a previously established communication continues without switching.

3. The device of claim 1 wherein a wireless network to communicate with the second communication module is selected from the group consisting of 2G, 3G, 4G, 5G, LTE, and WiMAX.

4. The device of claim 1 wherein the context comprises signal strength characteristics.

5. The device of claim 1 wherein the context comprises at least one of radio signal strength, available speed/bandwidth, delays, congestion, power requirements, availability of encryption, cost information, preference information, policy information, knowledge, quality of service information, service level agreement information, and history information.

6. The device of claim 1 wherein automatic switching is between bearers on a same network.

7. The device of claim 6 wherein automatic switching comprises sending data on a first bearer and data on a second bearer.

8. The device of claim 1 wherein the previously established communication comprises: a cellular communication, a VoIP communication/session, a voice communication/session, a video communication/session, a multimedia communication/session, a data communication/session, a SIP or IMS based communication and/or a WiFi communication.

9. The device of claim 1 wherein the previously established communication is secure or unsecure.

10. The device of claim 1 wherein the previously established communication is proprietary or standard.

11. The device of claim 1 wherein monitoring, detecting, and/or switching are based on the context are implemented using a distributed system.

12. A method comprising:
detecting a first context;
detecting a second context; and
automatically switching, with a server, a communication in progress via a wireless network to a communication via a network based on the second context, wherein automatically switching is based on detecting the second context being preferred over the first context within a set of known networks or from a newly discovered network, wherein upon activation of a timer, the server causes a communication module to change state from a sleep mode to a stand-by mode, and the server causes the communication module to change state from the stand-by mode to an active mode before a communication is switched to the communication module.

13. The method of claim 12, wherein the communication comprises a transmission of content.

14. The method of claim 12, wherein the communication comprises a data exchange.

15. The method of claim 12, wherein the communication comprises at least one of a telephone call, a voice call/communication, or duplex streaming/exchange.

16. The method of claim 15, wherein the communication comprises a telephone call transformed into a second communication.

17. The method of claim 16, wherein the second communication comprises at least one of a voice call/communication or duplex streaming/exchange.

18. The method of claim 12, wherein the communication comprises a transmission of content.

19. The method of claim 12, wherein the communication comprises a secure data exchange.

20. The method of claim 12, wherein the communication comprises an unsecured data exchange.

21. The method of claim 12, wherein the communication comprises data streaming.

22. The method of claim 12, wherein the communication comprises video exchange, streaming or video calling.

23. A method comprising:
determining a first context;
determining a second context; and
automatically switching, with a server, a communication in progress via a first network to a communication via a second network based on the second detected context, wherein automatically switching is based on detecting the second context being preferred over the first context within a set of known networks or from a newly discovered network, wherein upon activation of a timer, the server causes a communication module to change state from a sleep mode to a stand-by mode, and the server causes the second communication module to change state from the stand-by mode to an active mode before the communication is switched to the communication module.

24. The method of claim 23 wherein at least one of the first network and the second network is a wired network.

25. A method comprising:
determining a first context;
determining a second context; and
automatically switching a communication in progress via a first device to a communication via a second device based on the second detected context, wherein automatically switching is based on detecting the second context being preferred over the first context within a set of known networks or from a newly discovered network, wherein upon activation of a timer, a communication module of the second device changes state from a sleep mode to a stand-by mode, and the communication module of the second device changes state from the stand-by mode to an active mode before the communication is switched to the communication module of the second device.

26. The method of claim 25 wherein the method is stored, in part, within a mobile communication device.

27. The method of claim 25 wherein the method is implemented, in part, on a network-based device.

28. The method of claim 25 wherein the method is implemented, in part, on a switch and/or router.

29. The method of claim 25 wherein the method is implemented, in part, on a network-based switch and/or router.

30. The method of claim 25 wherein the method is implemented, in part, on an access point.

31. The method of claim 25 wherein the method is implemented, in part, on a base station.

32. The method of claim 25 wherein the method is implemented on a transportation device selected from the group consisting of an automobile, a ship, a boat, and an airplane.

33. The method of claim 25 wherein the method is implemented in software, firmware and/or hardware.

34. A server device comprising:
a switching system to switch operation between a communication module and a Wi-Fi communication module, wherein based on a first context and a second context, a communication automatically switches accordingly, wherein automatically switching is based on detecting the second context being preferred over the first context within a set of known networks or from a newly discovered network, wherein upon activation of a timer, the switching system causes the Wi-Fi communication module to change state from a sleep mode to a stand-by mode, and the switching system causes the Wi-Fi communication module to change state from the stand-by mode to an active mode before the communication is switched to the Wi-Fi communication module.

35. A device comprising:
a switching system to switch operation between a first communication module and a second communication module, wherein during an established communication if a preferable context is determined, the established communication is switched to a second communication over a network, wherein the preferable context is found in a set of known networks or in a newly discovered network, wherein upon activation of a timer, the switching system causes the second communication module to change state from a sleep mode to a stand-by mode, and the switching system causes the second communication module to change state from the stand-by mode to an active mode before a communication is switched to the second communication module.

36. The device of claim 35 wherein the network is operated by a different network provider.

37. The device of claim 35 wherein the network includes a plurality of access points, and the established communication is switched between the plurality of access points.

38. The device of claim 35 wherein the device comprises a terminal, a mobile device, a sensor, an access point, and/or a controller device.

39. A method comprising:
establishing a first communication link between a mobile communication device and an end destination device, wherein the first communication link comprises a first wireless communication link between the mobile communication device and a first wireless network;
monitoring a signal strength of the first wireless communication link;
when the signal strength drops below a threshold, notifying an interface server and establishing a second communication link between the interface server and the end destination device without disrupting the first communication link;
notifying the mobile communication device to terminate transmission over the first communication link; and
re-directing the second communication link from the interface server to another mobile communication device, thereby establishing a second wireless communication link between the mobile communication device and a second wireless network, wherein upon activation of a timer, the mobile communication device causes a communication module to change state from a sleep mode to a stand-by mode, and the mobile communication device causes the communication module to change state from the stand-by mode to an active mode before a communication is switched to the communication module.

40. The method of claim 39 wherein re-directing is known by preferences and attached or attachable to the network.

41. A method comprising:
monitoring a context of a first wireless communication link;
when a network is detected as available with a second wireless communication link with a context preferable to the first wireless communication link, notifying an interface and establishing the second communication link between the interface and an end destination device without disrupting the first communication link; and
re-directing the second communication link from the interface to a mobile communication device, thereby establishing the second wireless communication link between the mobile communication device and a second wireless network, wherein upon activation of a timer, the interface causes a communication module to change state from a sleep mode to a stand-by mode, and the interface causes the communication module to change state from the stand-by mode to an active mode before a communication is switched to the communication module.

42. The method of claim 41 wherein a function of the interface is distributed.

43. The method of claim 41 wherein the context comprises at least one of radio signal strength, available speed/bandwidth, delays, congestion, power requirements, availability of encryption, cost information, preference information, policy information, knowledge, quality of service information, service level agreement information, and history information.

44. The method of claim 41 wherein the method is distributed across a plurality of network components.

45. The method of claim 41 wherein the method is utilized in a peer-to-peer communication.

* * * * *